United States Patent [19]

Brucker

[11] 3,715,875
[45] Feb. 13, 1973

[54] LAWN MOWER SAFETY GUARD
[75] Inventor: William S. Brucker, Towson, Md.
[73] Assignee: The Black and Decker Manufacturing Company, Towson, Md.
[22] Filed: Feb. 9, 1972
[21] Appl. No.: 225,209

[52] U.S. Cl. .................................56/320.1, 56/17.4
[51] Int. Cl. ........................A01d 67/00, A01d 55/18
[58] Field of Search.........56/320.1, 320.2, 255, 17.4, 56/17.2, 17.5

[56] References Cited

UNITED STATES PATENTS

| | | | |
|---|---|---|---|
| 2,561,293 | 7/1951 | Ross | 56/17.4 |
| 2,578,880 | 12/1951 | Doyle | 56/17.2 |
| 3,485,018 | 12/1969 | Beckering | 56/13.6 |

Primary Examiner—Russell R. Kinsey
Attorney—Leonard Bloom et al.

[57] ABSTRACT

A rotary lawn mower comprising a deck housing supported by wheels for movement along the ground. A motor is supported upon the deck housing and drives rotary blade means disposed therebeneath. An upstanding handle is connected to the deck housing for control and manipulation of the mower. The handle is pivotally mounted upon the deck of flipover movement to facilitate opposite directional, longitudinal movement of the mower without having to turn it around. Novel guard means is provided on the mower to prevent an operator's foot from accidentally coming into contact with the rotary blade means. The guard means is constructed to so protect the operator's feet in both longitudinal directions of movement of the mower, and to minimize interference with efficient grass cutting.

2 Claims, 7 Drawing Figures

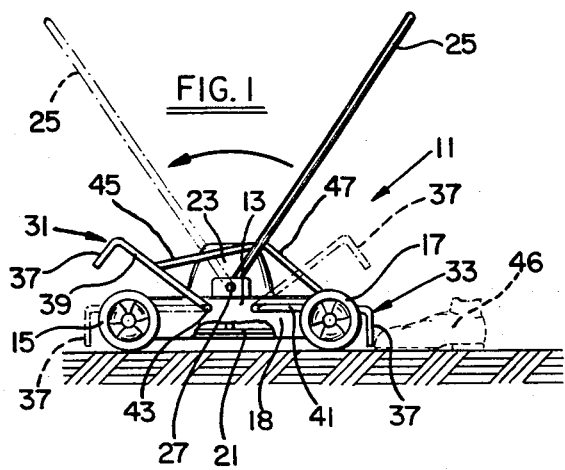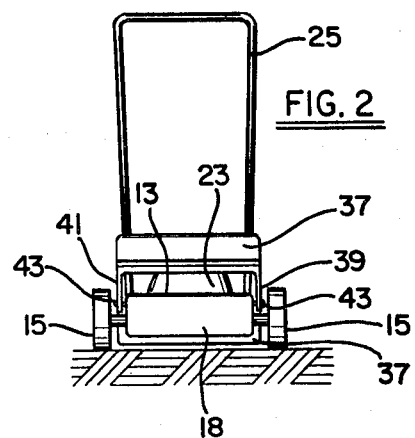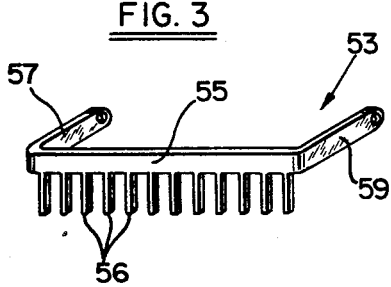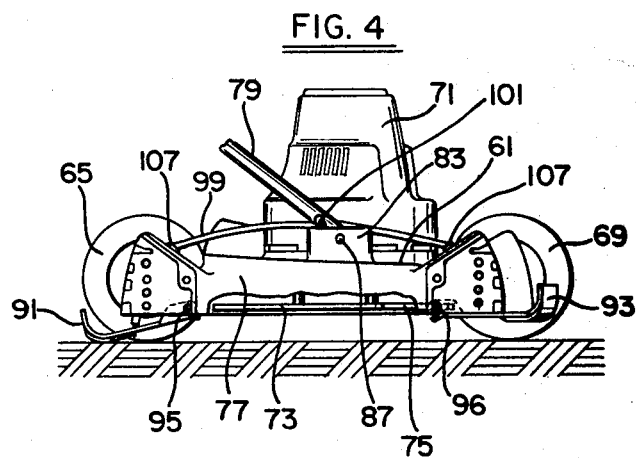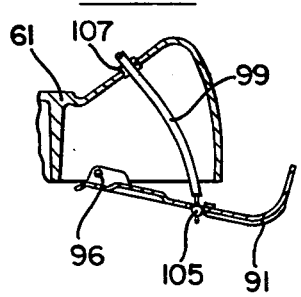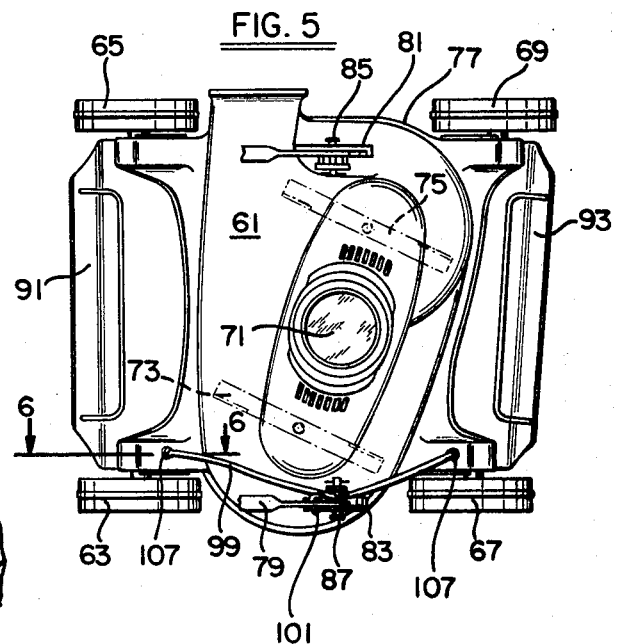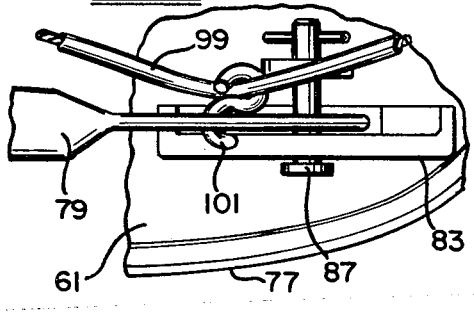

LAWN MOWER SAFETY GUARD

SUMMARY OF THE INVENTION

The present invention is directed to a guard construction for a rotary lawn mower having a reversing handle for forward and reverse mower travel, wherein the guard construction is interconnected with the handle to position the guard for operator protection in both directions of mower travel, and to prevent the guard from interfering with efficient mower operation, i.e., grass cutting. The guard is automatically positioned in response to handle movement to prevent the operator's foot from accidentally coming in contact with rotary blade means disposed beneath the mower deck, and from being struck by hard objects which might be thrown outwardly of the deck by the rotating blade means. At the same time the guard is automatically positioned, also in response to handle movement or positioning, to prevent interference with efficient cutting. Thus, the guard construction is designed for maximum operator safety with no adverse effect on the performance of the mower in cutting. The guard construction embodies simplicity and a minimum of change to existing mower construction and yet satisfies safety needs, and characteristically has a long life.

Main objects, therefore, of the present invention are to provide a novel guard construction for rotary lawn mowers having a reversible handle for forward and reverse mower travel, which guard construction protects the feet of the operator in both directions of travel of the mower and offers no impedance to mower cutting efficiency.

Further important objects of the present invention are to provide a guard construction of the above character which functions automatically to provide safety to the operator, and which is capable of adaptation to a variety of rotary lawn mowers of the type described with a minimum of part change or modification.

Additional important objects of the present invention are to provide a novel guard construction of the above character which is relatively inexpensive to manufacture, rugged in construction, and reliable in use.

Other objects and advantages of the invention will become more apparent from a consideration of the detailed description to follow taken in conjunction with the drawings annexed hereto.

BRIEF DESCRIPTION OF THE DRAWINGS

FIG. 1 is a side elevational view of a rotary lawn mower embodying the present invention;

FIG. 2 is a front elevational view of the construction of FIG. 1;

FIG. 3 is a perspective view illustrating a modified form of guard;

FIG. 4 is a side elevational view, to an enlarged scale, showing a rotary lawn mower including a specific constructional embodiment of the invention;

FIG. 5 is a top plan view for the construction of FIG. 4;

FIG. 6 is an enlarged sectional view of the construction of FIG. 5 taken along the lines 6—6 thereof; and FIG. 7 is an enlarged view of a portion of FIG. 6.

DETAILED DESCRIPTION

Referring now more specifically to the drawings, a rotary lawn mower embodying the present invention is illustrated generally at 11 in FIGS. 1 and 2 and is seen to include a deck housing 13 supported for movement along the ground by forward and rearward wheels 15, 17, respectively. The deck 13 is provided with a peripheral skirt 18 which defines the blade enclosing cavity in which rotary blade means 21 is disposed. A motor 23 is supported atop the deck 13 and drivingly engages the blade means 21.

A handle 25 extends upwardly from the deck housing 13 for control and manipulation of the mower 11. As shown, the handle 25 is pivoted to the deck housing 13 by pins 27. The handle 25 is positionable as shown in solid lines and dot-dash lines in FIG. 1, in oppositely disposed, upwardly extending positions so that the mower 11 can be pushed in opposite longitudinal directions without having to turn the mower 11 around. This is a relatively common practice particularly in a number of electric-powered, corded lawn mowers, and facilitates back and forth mower movement without danger of cutting the electric cord.

One of the safety considerations in rotary lawn mowers resides in the need to protect the feet of the operator from accidentally coming in contact with the rotary blade means 21. In addition, it is important also to protect the operator from being struck by stones or other hard objects thrown outwardly by the rotating blade means 21.

Traditionally, the lower peripheral edge of the deck housing skirt of these lawn mowers, although below the plane of the rotary blade means, is necessarily spaced above the ground so that the mower can pass over the grass. To protect the feet of the user as he walks along behind the mower, many of them embody a "drag plate" or similar device which extends below the skirt and rides over the ground at the trailing end of the deck housing.

In mowers of the type illustrated herein, the "trailing end" changes at the end of each mower run since, to reverse the direction of travel, the user reverses the handle, e.g., flips the handle over, and pushes the mower from the opposite end, as distinguished from turning the mower around at the end of each run. It will be appreciated then that to properly protect the user's feet in these mowers, a guard is needed at both ends of the deck housing. However, while the guard at the trailing end of the deck (in the direction of movement) protects the operator's feet, the guard at the leading end of the deck actually impedes efficient mower use. This is so since a leading guard would engage the grass and lay it flat before it can be cut by the blade means. In addition, the taller uncut grass engaged by a leading guard would offer substantial resistance to mower movement.

In accordance with the present invention, novel guard means is provided at both ends of the deck housing and is interconnected with the movable handle so that in each direction of lawn mower travel, the guard means at the trailing end of the mower is in a position protecting the operator's feet, while the guard means at the leading end of the mower is withdrawn from the guarding position and does not interfere with cutting action of the blade means or with movement of the mower.

One such guard construction embodying the present invention is illustrated in FIGS. 1 and 2 as including a pair of guards 31, 33 each of which is generally U-shaped in configuration, having a transverse apron 37 and a pair of mounting arms 39, 41. As shown, the arms 39, 41 are pivoted upon the deck 13 by pins 43 and each guard 31, 33 is movable from a raised, non-guarding position shown in full lines for the guard 31 in FIGS. 1 and 2, to a lowered, guarding position shown in full lines for the guard 33.

The guards 31, 33 are interconnected with the handle 25 so that guards 31, 33 are movable into a desired respective position in response to reverse (e.g. flipover) movement of the handle 25. Thus, when it is desired to move the mower 11 in a left hand direction, as seen in FIG. 1, the handle 25 is positioned as shown in full lines therein so that the operator can walk along behind the mower 11 and manipulate and control it by means of the handle. At this time, the guards 31, 33 are desirably positioned as shown in full lines therein, the guard 33 being in the lowered position to protect the operator's feet 46 from accidentally coming into contact with the blade means 21 and the guard 31 being raised to facilitate efficient cutting and easy movement of the lawn mower 11 in this direction. When the handle 25 is reversed and located in the position shown in dot-dash lines in FIG. 1, the mower 11 is adapted to be moved in a right-hand direction. In this instance, it is desirable that the guard 31 be lowered to a guarding position and the guard 33 raised to a non-guarding position, these positions being shown in dot-dash lines in FIG. 1.

Interconnection between the handle 25 and the guards 31, 33 is illustrated schematically as linkage means including link components 45, 47 suitably interconnecting the handle 25 with guard 31 and the handle 25 with the guard 33 respectively. It will be appreciated that this linkage means can take any of a number of desired shapes and/or configurations including pivoted links, cables, etc., it only being necessary that the linkage means cause the guards 31, 33 to move to the described positions in response to handle movement. Thus, regardless of the direction of movement of the lawn mower 11, the guard at the trailing end thereof is located to protect the feet of the operator from accidentally gaining access to the rotating blade means 21. FIG. 1 illustrates an operator's foot 46 and the manner in which the guard 33 prevents accidental injury thereto.

A modified form of guard construction is illustrated generally at 53 in FIG. 3 and is seen to include a generally U-shaped body having an apron 55 and a pair of arms 57, 59. This guard apron 55 includes a plurality of downwardly depending teeth 56 which are spaced apart a distance to prevent access to the rotating blade means, and to prevent hard objects thrown outwardly by the rotating blade means from injuring the operator. In all other respects, this version is substantially identical to that illustrated and described above.

A specific constructional embodiment of guard construction and a specific linkage means according to the present invention is illustrated in FIGS. 4–6. The mower shown there includes a deck housing 61 supported by forward wheels 63, 65 and rearward wheels 67, 69. A motor 71 is supported atop the deck 61 and drives a plurality of rotary blades 73, 75 disposed beneath the deck 61 and within a cavity defined by a peripheral skirt 77. A handle 79 is pivoted to lugs 81, 83 rigid with the deck 61 by pins 85, 87, respectively. As with the case in the construction described above, the handle 79 extends upwardly from the deck 61 for control and manipulation of the mower and is adapted to be reversed or flipped over to oppositely disposed, inclined positions. This is to facilitate manipulation and control of the mower in opposite longitudinal directions, that is, in a left-hand or right-hand direction as seen in FIGS. 4 and 5. Latching means (not shown) may be provided to releasably secure the handle 79 in the described oppositely disposed positions for safety reasons.

A pair of guards 91, 93 are pivotally secured at the forward and rearward ends of the deck housings 61 by pins 95, 96. These guards 91, 93 are movable from a retracted position substantially coextensive with the lower peripheral edge of the skirt 77 to a guarding position where they extend somewhat below a lower peripheral edge of the skirt 77 and can engage the ground. As described above in FIGS. 1 and 2, the guards 91, 93 are interconnected with the handle 79 so that when viewing the direction of mower travel, the guard at the rearward or trailing end of the mower is always lowered and in the guarding position, while the guard at the leading end of the mower is in the raised or retracted position. This is achieved by means of an elongated flexible cable 99 interconnected at its ends to respective ones of the guards 91, 93 and at an intermediate point to the handle 79. As shown, the cable 99 may be connected with handle 79 by a simple wire clip 101 crimped on cable 99, and to the guards 91, 93 by an enlarged nut 105 (see FIG. 6). In the embodiment shown, the cable 99 extends slidably through the wheel mounting portion of the deck housing 61 and is slidably guided therein by grommets 107. Thus, when the handle 79 is in the position shown in FIGS. 4 and 5, the trailing guard 91 is lowered and in the guarding position while the leading guard 93 is raised to facilitate entry of grass to the cutting blade means 73, 75 for efficient cutting thereof. When the handle 79 is flipped over to the opposite position from that shown in FIGS. 4 and 5, the cable 99 is moved linearly toward the right as seen in these figures thereby causing the guard 93 to drop downwardly into a guarding position and the guard 91 to be raised into a non-guarding position. In this position of parts, the mower is adapted to travel in a left hand direction as seen in FIGS. 4 and 5.

The construction described and shown in FIGS. 4–6 thus functions in substantially the same manner as that described above in FIGS. 1 and 2, that is, the feet of the operator are protected from gaining access accidentally to the cutting chamber and being injured by the rotating cutting blade means for both directions of travel of the lawn mower. In addition, in both directions of travel of the lawn mower, the leading guard is raised and provides no barrier to efficient and effective cutting of the grass and does not impede mower travel. Thus, efficient cutting and easy mower use is maintained while providing maximum safety to the operator.

By the foregoing there has been disclosed a novel guard construction for rotary lawn mowers which travel in opposite longitudinal directions, and while the preferred embodiments of the present invention have been illustrated and described in detail herein, various additions, substitutions, omissions and modifications may be made thereto without departing from the spirit of the invention.

I claim:

1. A lawnmower of the type comprising a deck including a peripheral skirt supported by wheels for movement over the ground, a motor supported upon said deck, rotary blade means disposed beneath said deck and within said skirt and driven by said motor, a handle extending upwardly from said deck and pivotally attached thereto and positionable in first and second oppositely disposed, upwardly inclined positions, whereby to facilitate manipulation and control of said lawnmower during movement thereof in opposite longitudinal directions; the improvement in said lawnmower, which includes guard members pivoted to said deck at opposite ends thereof, each of said guard members having an uninterrupted apron adapted to span substantially the width of its associated end of said deck, means independent of said pivot connections interconnecting said handle and said guard members and operable to cause said first guard member to pivot to a position below the skirt at one end of said deck housing, and said second guard portion to pivot to a position at or above the skirt at the other end of said deck, when said handle is moved to a position inclined toward said first deck housing at said one end, said handle and said interconnecting means being operable to cause said second guard portion to pivot into a position lower than the skirt at the other end of said deck housing, and to pivot said first guard portion to a height at or above the skirt at said one end of said deck housing, when said handle is moved into an oppositely inclined position towards said other end of said deck housing.

2. A rotary lawnmower comprising a deck housing supported fore and aft by wheels adjacent the side edges thereof, said deck housing defining a blade enclosure, rotary blade means disposed within said enclosure, a motor supported upon said deck housing and interconnected with said rotary blade means to drive the latter, handle means extending upwardly from said deck and movably supported thereon for movement from a first to a second oppositely disposed position, whereby to facilitate manipulation and control of said mower in opposite longitudinal directions, guard means including first and second members pivoted on said deck adjacent opposite ends thereof and adapted to extend below the level of said blade enclosure and having uninterrupted aprons spanning substantially the distance from wheel to wheel at opposite ends, respectively, of said deck housing, linkage means independent of said guard member pivots and interconnecting said guard members and said handle, and operable to lower the guard member at the trailing end of said deck and raise the guard member at the leading end of said deck in response to positioning said handle for manipulation and control of said mower, whereby said guard members are positioned to protect the feet of the user from gaining access to the blade cavity as he walks along in back of the mower in either direction of movement thereof, and whereby said guard members present minimum impedance to grass cutting at the leading end of said mower.

* * * * *